Figure 1:
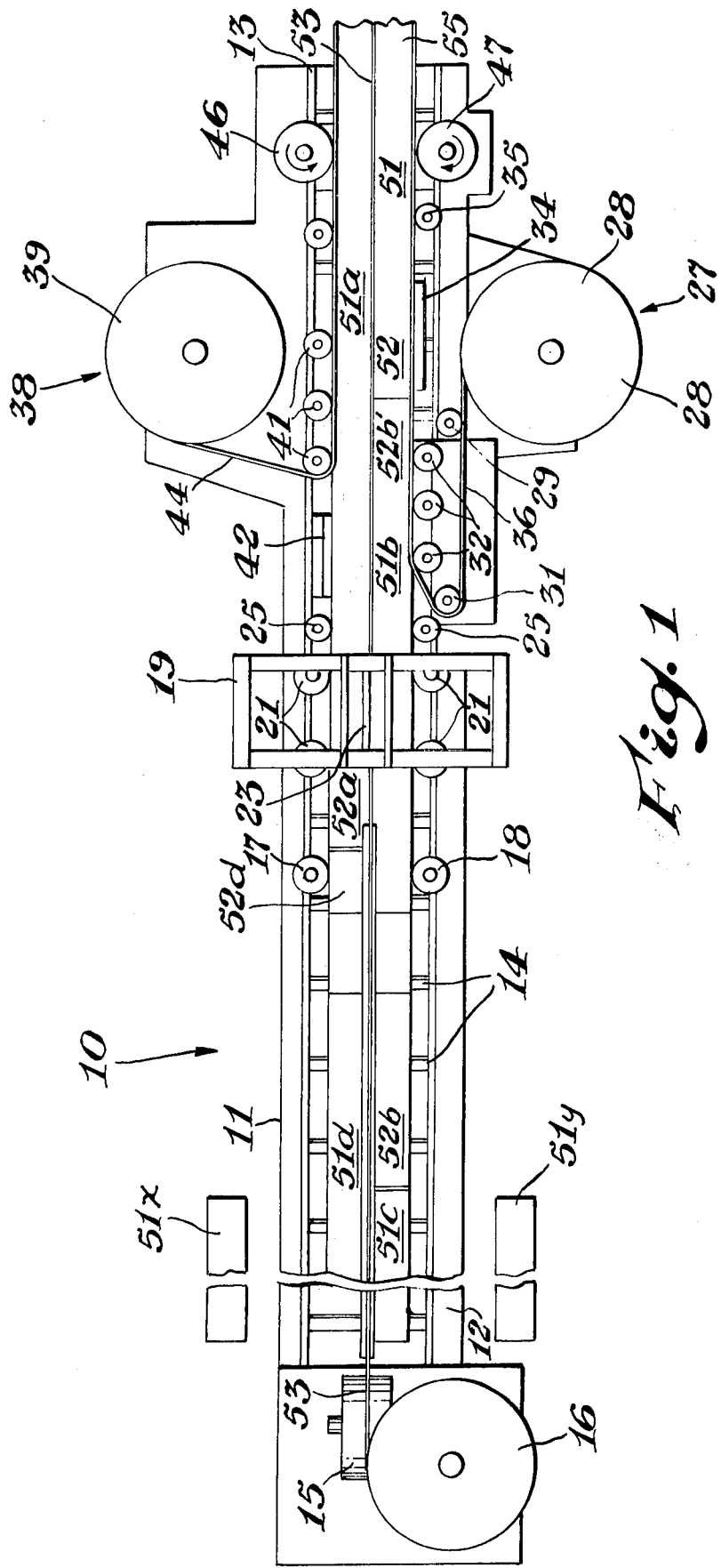

United States Patent [19]

Smith, Jr. et al.

[11] 4,049,852
[45] Sept. 20, 1977

[54] LAMINATE PREPARATION AND APPLICATION THEREOF

[75] Inventors: Hubert Stacy Smith, Jr., Essexville; Robert A. Hay, II, Midland, both of Mich.

[73] Assignee: The Dow Chemical Company, Midland, Mich.

[21] Appl. No.: 609,468

[22] Filed: Sept. 2, 1975

[51] Int. Cl.² .............................................. B32B 3/26
[52] U.S. Cl. ................................... 428/55; 156/157; 156/210; 428/71; 428/313; 428/315
[58] Field of Search .................. 428/310, 315, 48, 54, 428/55, 56, 57, 71, 75, 76, 139, 140, 198, 311, 313, 314; 156/304, 306, 309, 157, 210

[56] References Cited

U.S. PATENT DOCUMENTS

| | | | |
|---|---|---|---|
| 3,560,315 | 2/1971 | Evans et al. | 156/304 |
| 3,591,443 | 7/1971 | Cox | 428/310 |
| 3,755,063 | 8/1973 | Massey et al. | 156/210 |
| 3,874,983 | 4/1975 | Hay et al. | 428/313 |
| 3,892,899 | 7/1975 | Klein | 428/310 |

FOREIGN PATENT DOCUMENTS 1,362,035  4/1964  France ................... 428/315

*Primary Examiner* — Wiliam J. Van Balen
*Attorney, Agent, or Firm* — R. B. Ingraham

[57] ABSTRACT

A laminate of foam planks is prepared by bonding closed cell foam slabs to either side of a foraminous reinforcing skin, applying a second skin to one side of the laminate formed. In formation of the laminate, the ends of adjacent foam slabs are butted together under mild pressure. The resultant laminate is particularly suitable for the preparation of spirally generated thermal insulation about a vessel wherein the second skin is disposed remote from the vessel. An insulation strip or laminate having very satisfactory performance is obtained with a minimal number of processing steps.

9 Claims, 4 Drawing Figures

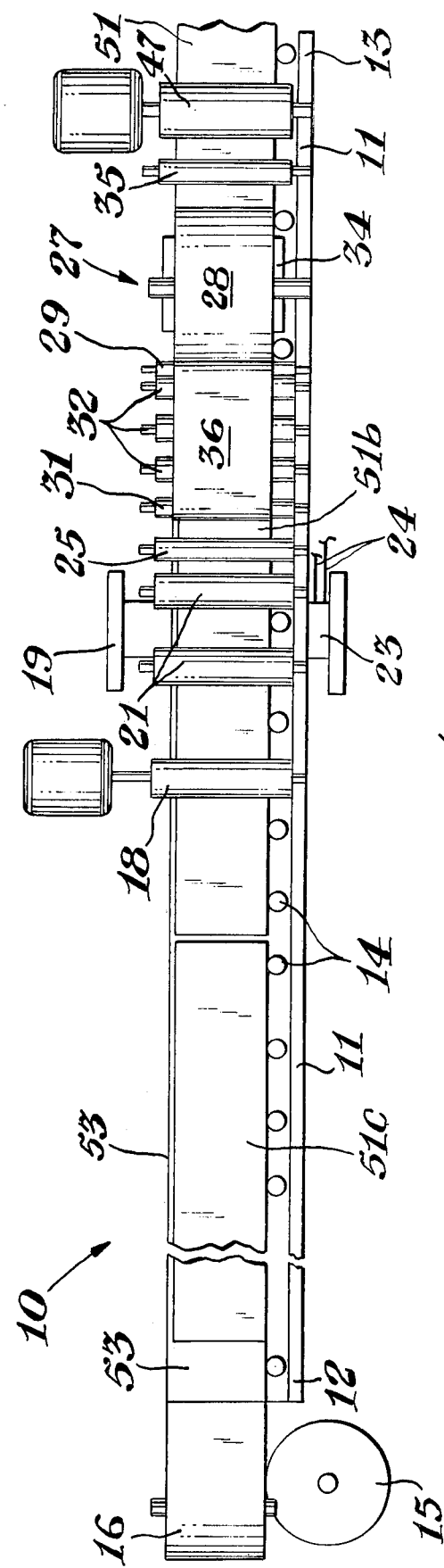
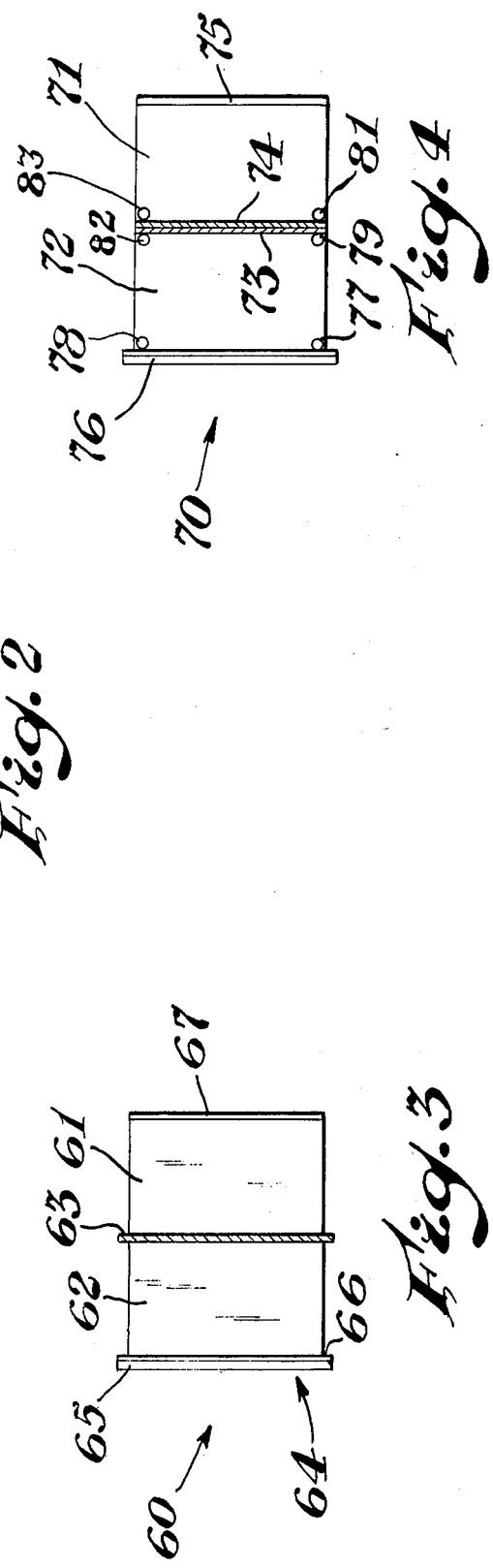

LAMINATE PREPARATION AND APPLICATION THEREOF

In the preparation of insulated cryogenic vessels, particularly those suited for the storage of transportation of liquefied natural gas and other cryogenic liquids, it is often a substantial advantage to employ an insulating technique, frequently referred to as the spiral generation technique. This technique is disclosed in U.S. Pat. Nos. 3,206,899; 3,337,384; 3,879,254; and 3,874,983. Thermal insulation on a cryogenic vessel is subjected to substantial stresses which are induced by the great difference in temperature between the insulation adjacent the vessel wall and the insulation remote from the vessel wall. Laminate structures employing a foraminous scrim, such as an open weave glass fiber scrim, have been incorporated within elongate foam strips or laminated planks for use in the spiral generation insulation process. Generally, such laminates are prepared in lengths appropriate for shipping, for example, lengths of about 15 feet. The complete laminate usually consists of an exterior skin, for example, an aluminum sheet bonded to a foam plank which in turn is bonded to a glass fiber reinforcing scrim. A number of foam planks may be edge bonded to the scrim and an additional scrim bonded to the planks at a location remote from the aluminum skin. The laminated insulating strips are subsequently bonded together, usually by heat welding in end-to-end relationship to form an insulating laminate strip which is then wound about the vessel to be insulated and the adjacent loops or turns being bonded in edge-to-edge relationship. The foregoing procedure requires substantial equipment. An apparatus is required for the lamination of foam elements and the more or less centrally disposed reinforcing scrim. Another apparatus is required to bond together the shorter laminated pieces in end-to-end relationship, to apply the metallic or outer surface skin and a foraminous reinforcing scrim at a location parallel to and remote from the aluminum skin.

It would be desirable if there were available an improved insulating laminate for use in the spiral generation of insulating structures.

It would also be desirable if there were available an improved method for assembly of an elongate thermoplastic foam insulating strip for use in a spiral generation process.

It would also be desirable if there were available a means to reduce the manual labor required in a process for applying foam insulating material by the spiral generation process.

These benefits and other advantages in accordance with the present invention are obtained in a method for the preparation of a laminate containing a synthetic resinous thermally insulating plastic foam from a plurality of elongate generally rectangular plastic foam insulating bodies, a foraminous reinforcement and a generally gas impermeable facing, the steps of the method comprising providing a foraminous reinforcing strip having a width approximating the width of a desired foamed insulating strip, providing a first synthetic resinous elongate foam insulating body, disposing a face of the first body adjacent the foraminous strip, disposing a second elongate plastic foam insulating body adjacent an opposite face of the foraminous strip to thereby sandwich the strip between the first and second body wherein adjacent ends of the first and second bodies are displaced along the length of the foraminous strip providing a third foam insulating body adjacent the first foam body in end-to-end relationship therewith to sandwich the reinforcement between the first and third bodies and the second body, maintaining adjacent ends of the first and third bodies under compression sufficient that no visible space exists between the ends, joining the first body to the second body and the first body to the third body, affixing to a surface of the first and third bodies remote from the reinforcement member a generally vapor impervious skin and in a preferred embodiment of the present invention passing the resultant laminate to a spiral generation apparatus.

Also contemplated within the scope of the present invention is a laminate of a plurality of elongate foamed synthetic resinous bodies, the laminate comprising a first plurality of elongate generally rectangular foamed resinous bodies, a second plurality of elongate generally rectangular synthetic resinous bodies, the first plurality of synthetic resinous bodies being arranged in end-to-end relationship, the second plurality of bodies also being arranged in end-to-end relationship, the first and second plurality being in generally parallel face-to-face arrangement, the first and second plurality of bodies each having a plurality of locations where adjacent elements abut, the abutting location of the first plurality of bodies and the second plurality of bodies being axially displaced from each other, a reinforcement member being disposed between the first and second plurality of bodies, the first and second plurality having adjacent faces connected, a skin member being generally impervious to organic vapors being disposed generally parallel to the reinforcement member and connected to the first plurality at a location remote from the reinforcement member with the further limitation that the abutting ends of the first plurality and the abutting ends of the second plurality are pressed together with a force sufficient that no visible gap exists between adjacent ends.

Further features and advantages of the present invention will become more apparent from the following specification taken in connection with the drawing wherein:

FIGS. 1 and 2 schematically depict the process and laminate of the present invention, FIG. 3 is an end view of a laminate in accordance with the present invention.

FIG. 4 is an end view of an alternate embodiment of laminate in accordance with the present invention.

In FIGS. 1 and 2 there is depicted top and side schematic representations of a laminating apparatus generally designated by the reference numeral 10. The apparatus 10 comprises an elongate frame 11 having a first or feed end 12 and a second discharge end 13. The apparatus 10 has a plurality of generally parallel conveyor rolls 14 in spaced parallel relationship and extending from the first end 12 to the second end 13. A reinforcement supply means 15 or reinforcing scrim roll is supported adjacent the first end 12. A filamentary reinforcement supply means 16 is disposed adjacent the supply means 15. The supply means 15 provides a reinforcement strand such as glass fiber roving wire or the like. The apparatus 10 has a first pair of feed rolls 17 and 18, respectively. Feed rolls 17 and 18 are disposed in generally parallel relationship and extend generally normally to the conveyor rolls 14. A joining means 19 is disposed between the feed rolls 17 and 18 and the second end 13. The joining means is immediately adjacent the rolls 17 and 18. The joining means comprise four pressure rolls designated by the reference numerals 21. The four rolls 21 are parallel to the rolls 17 and 18 with two of the rolls 21 and the roll 17 having axes which are generally coplanar and two of the rolls 21 having axes which are coplanar with the axis of roll 18. A heating platen 23 is disposed generally between the pairs of rolls 21 and extends vertically from a plane containing the axis of the roll 14 and is generally parallel to a plane containing the axis of roll 17 and adjacent rolls 21 and a plane containing the axis of roll 18 and its adjacent pair of rolls 21. An energy source 24 such as an electric cable is in operative connection with the heating means or platen 23. A pair of pressure or bonding rolls 25 are disposed generally on opposite sides of the frame 11 and extend in a direction generally parallel to the rolls 21. The rolls 25 are adjacent the rolls 21 and remote from the rolls 17 and 18. A laminate or skin applicator assembly 27 is disposed adjacent the joining means 19 and the second end 13. The skin applicator 27 comprises a skin supply means or roll 28 supported upon the frame 11, a first idler roll 29 remotely disposed from the rolls 25 and a second idler roll 31 disposed generally adjacent a roll 25. The axes of rolls 28, 29 and 31 are parallel to the axes of the rolls 21. Disposed between rolls 29 and 31 are three compression rolls 32 which are resiliently tensioned toward the center of the frame 11. A heating platen 34 is disposed between the rolls 32 and the second end 13 of the frame 11. The heating platen has a planar work contacting face which lies in a plane generally perpendicular to a plane containing the rolls 14 and extending from the first end 12 to the second end 13 of the frame 11. Disposed between the platen 34 and the second end 13 is a pressure or bonding roll 35 having an axis generally parallel to the axis of roll 18. A skin or web 36 passes from the roll 28 over the idler rolls 29 and 31 and beneath the rolls 32 and platen 34 and the bonding roll 35. Generally oppositely disposed to the skin applying means 27 is a reinforcement scrim applying means 38. Means 38 comprises a supply roll 39 rotatably mounted on the frame 11, a plurality of pressure rolls 41 disposed between the roll 17 and the second end 13, a heating platen 42 having a workpiece engaging face parallel and oppositely disposed to the work engaging face of the platen 34. A reinforcement scrim 44 is shown unwinding from the roll 39 passing beneath the rolls 41. The platen 42 is disposed between the rolls 41 and the roll 25. A pair of drive rolls 46 and 47 are disposed on the frame 11 at a location between the roll 41 and the second end 13. The drive rolls 46 and 47 have axes generally parallel to the axes of rolls 17 and 18. A first elongate generally rectangular synthetic resinous foam insulating member 51 is disposed between the drive rolls 46 and 47. The member 51 has a first end 52 and a second end not shown. A second elongate generally rectangular foam member 51a is disposed adjacent member 51 and has a first end 52a and a second end not shown. A reinforcement scrim 53 is disposed between the members 51 and 51a. The scrim 53 has been unwound from the supply roll 15. The ends 52 and 52a have been displaced from each other, a third foam member 51b having a first end 52b and a second end 52b'. The end 52b' is immediately adjacent the end 52 and butted tightly thereto. The end 52a is disposed approximately midway between the ends 52b and 52b' of the third member 51b. A fourth insulating element 51d having an end 52d is disposed generally coaxially with element 51a and the ends 52d and 52a are butted tightly together. Similarly disposed adjacent element 51b is an element 51c. Remote from the frame are insulating elements 51x and 51y.

In operation of the apparatus 10, the drive rolls 17 and 18, 46 and 47 rotate in a direction indicated by the arrows moving insulating elements 51 in a direction from the first end 12 toward the second end 13. A scrim 53 from supply means 16 is disposed between opposed elements such as the elements 51d and 51c, the ends of the elements being axially displaced in such a manner that elements which have face-to-face contact do not have ends which are adjacent. The drive rolls 17 and 18 force the insulating elements over the heating platen 23. The rolls 21 force the elements into engagement with the platen 23 where adjacent surfaces are heated to a thermoplastic condition. The elements and reinforcing scrim then pass between the pressure rolls 25 which force the freshly heat-plastified surfaces of the insulating elements 51 and 51a together and encapsulate or sandwich the scrim 53 whereupon cooling firmly unite both the adjacent insulating elements and scrim into a unitary body. The platen 42 heat plasticizes the surface of an adjacent insulating element which passes beneath the rolls 41 and the reinforcing scrim 44 is bonded to the so-formed laminate. Skin material from the roll 28 passes over the idler rolls 29 and 31 and is positioned on a surface of an insulating element remote from the surface receiving the surface of the scrim 44 and beneath the heating platen 34 where beneficially an organic vapor-impermeable web or skin is applied to the surface of the insulating element thereby providing a complete laminate 55. The rolls 17 and 18 operate at a slightly higher surface speed than the rolls 46 and 47; beneficially, the difference in surface speed being in the order of 1 to 5 percent. The differential surface speed of the roll pair 17 and 18 and the roll pair 46 and 47 causes adjacent ends of the insulating elements to be butted together without a visible gap, thus providing a complete laminate having a significantly greater rigidity than would be obtained if a visible gap were permitted.

In FIG. 3 there is schematically depicted an end view of a laminate in accordance with the present invention generally designated by the reference numeral 60. The laminate 60 comprises a first thermally insulating body 61 and a second thermally insulating body 62. The bodies 61 and 62 are equivalent to the elements 51 and 51a shown in FIG. 1, having a foraminous reinforcing scrim 63 such as a glass fiber scrim. The elements 61 and 62 are heat bonded to each other and to the scrim 63. A skin 64 is disposed on one surface of the element 60 and extends generally parallel to the reinforcing scrim 63. The skin 64 comprises a vapor-impermeable layer 65 such as an aluminum sheet or foil and heat-activatable adhesive 66, which beneficially adheres the metal 65 to the foam body 62. A foraminous reinforcement 67 such as a glass fiber scrim is shown affixed to the insulating element 61 at a location remote and parallel to the skin 64. Beneficially, the reinforcement 67 may extend beyond the foam bodies as depicted in FIG. 3 thereon joining laminates in edge-to-edge relationship by heat welding. The reinforcement is folded 90°, either toward or away from the skin 64, to provide further reinforcement of the edge-to-edge weld. Alternatively, if such reinforcement is unnecessary, the reinforcement may be less than the width of the body 62.

The reinforcement 67 is employed with benefit where the laminate is being used in cryogenic insulation with metal skin being disposed remote from the vessel to be insulated. The scrim or reinforcement 67 tends to reduce cracking of the foam due to the influence of the low temperatures. A reinforcement such as 67 also provides an added benefit in that it stiffens the laminate and consequently less support is required for the laminate when being fed from the laminating equipment to the vessel being insulated. The choice of the particular variety and thickness of foam reinforcing scrim, vapor barrier and the like will depend upon the particular end use application of the laminate. However, for most applications polystyrene foam, preferably of the extruded variety, aluminum skins having a heat activatable adhesive such as an ethylene-acrylic acid copolymer containing about 15 weight percent acrylic acid and reinforcements being an open weave glass fiber scrim are found to be satisfactory for many cryogenic applications.

In FIG. 4 there is schematically depicted an end view of an alternate embodiment of a laminate of the present invention generally designated by the reference numeral 70. The laminate 70 of FIG. 4 is of similar construction of the laminate of FIG. 3 and comprises a first synthetic resinous foam insulating body 71, a second synthetic resinous body 72 disposed in generally face-to-face relationship with the body 71. First and second reinforcement scrims 73 and 74 are disposed in a region of a heat weld between the bodies 71 and 72. A cold side reinforcement scrim 75 is bonded to the body 71 remote from the reinforcement scrims 73 and 74. The vapor-impermeable face 76 is affixed to the body 72 at a location generally adjacent the reinforcement scrims 73 and 74 and remote from the scrim 75. Vapor-impermeable skin 76 is of generally similar construction to the skin 65 of FIG. 3. A first filamentary reinforcement 77 is disposed within the foam body 72 adjacent one edge of the body 72 and the skin 76. Beneficially, the filamentary reinforcement 77 is glass fiber roving, cord or a metal wire, for example, steel wire. Such a reinforcement is readily incorporated during the laminating step by carrying along the filamentary reinforcement such as that dispensed from the supply means 16 of FIG. 1 and continuously heat laminating in the desired locations. Optionally, such filamentary reinforcement can be preheated by hot gas such as hot air or radiant heat prior to entering the laminating nip or pressure zone. Similar reinforcement 78 is disposed at the opposite edge of portion 72 generally adjacent the skin 46. For additional filamentary reinforcement, elements 79, 81, 82 and 83 are disposed with reinforcements 79 and 81 generally adjacent one edge of the laminate 70 and reinforcements 82 and 83 adjacent the opposite edge. The filamentary reinforcements 79, 81, 82 and 83 are disposed generally adjacent the reinforcements or scrims 73 and 74. Although six filamentary reinforcements are depicted in the laminate 70 of FIG. 4, for many applications the laminate is substantially improved in handling characteristics by the addition of one or more reinforcements. The size and location of the filamentary reinforcements is dependent on the treatment of the laminate before and after being installed in its permanent location as an insulating member. If the laminates are to be installed in an equatorial position of a spherical tank and the radius of curvature through which the laminate will be bent is large, the reinforcement filaments are not necessary. If, however, due to the presence of the existing structure the laminate must undergo substantial bending such as they may receive as the spiral turns approach the polar regions of a spherical vessel, reinforcements such as 77, 79 and 81 can be highly desirable to prevent rupture or spreading of the compressed butt-joints between adjacent foam bodies. If the laminate in reaching its final destination must be first bent in one direction about a relatively short radius and subsequently bent in the opposite direction about a similarly short radius, the reinforcements 78, 81, 82 and 83 would be employed in tension for one bend while the reinforcements 77, 79 and 81 for the bending in the opposite direction are employed. Thus, the selection of the particular filamentary reinforcement used is dependent on the particular stresses at any particular laminate which would be required to withstand in handling and/or service. Beneficially, the laminate of the FIG. 4 employs two reinforcement members or scrims 73 and 74. The use of two reinforcement members simplifies the lamination procedure in that each side of the laminating platen or heat sealing platen such as the platen 23 of FIGS. 1 and 2 may be maintained at generally identical temperatures and the amount of melting or softening of the foam on the portions 71 and 72 is substantially equal.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the prepartion of a laminate containing a synthetic resinous thermally insulating plastic foam from a plurality of elongate generally rectangular plastic foam insulating bodies, a foraminous reinforcement and a generally gas impermeable facing, the steps of the method comprising providing a foraminous reinforcing strip having a width approximating the width of a desired foamed insulating strip, providing a first synthetic resinous elongate foam insulating body, disposing a face of the first body adjacent the foraminous strip, disposing a second elongate plastic foam insulating body adjacent an opposite face of the foraminous strip to thereby sandwich the strip between the first and second body wherein adjacent ends of the first and second bodies are displaced along the length of the foraminous strip, providing a third foam insulating body adjacent the first foam body in end-to-end relationship therewith to sandwich the reinforcement between the first and third bodies and the second body, maintaining adjacent ends of the first and third bodies under compression sufficient that no visible space exists between the ends, joining the first body to the second body and the first body to the third body, affixing to a surface of the first and third bodies remote from the reinforcement member a generally vapor impervious skin.

2. The method of claim 1 wherein the foam insulating bodies are joined by heat welding.

3. The method of claim 1 including the step of passing the resulting laminate to a spiral generation apparatus.

4. The method of claim 1 including the steps of applying to the laminate a refinforcement scrim generally adjacent and parallel to the foraminous strip.

5. The method of claim 1 wherein the vapor impervious scrim is a metal.

6. A laminate of a plurality of elongate foamed synthetic resinous bodies, the laminate comprising
   a first plurality of elongate generally rectangular foamed resinous bodies,
   a second plurality of elongate generally rectangular synthetic resinous bodies, the first plurality of synthetic resinous bodies being arranged in end-to-end relationship, the second plurality of bodies also being arranged in end-to-end relationship, the first and second plurality being in generally parallel face-to-face arrangement, the first and second plurality of bodies each having a plurality of locations where adjacent elements abut, the abutting locations of the first plurality of bodies and the second plurality of bodies being axially displaced from each other,
   a reinforcement member being disposed between the first and second plurality of bodies, the first and second plurality of bodies, the first and second plurality having having adjacent faces connected,
   a skin member being generally impervious to organic vapors being disposed generally parallel to the reinforcement member and connected to the first plurality at a location remote from the reinforcement member with the further limitation that
   the abutting ends of the first plurality and the abutting ends of the second plurality are pressed together with a force sufficient that no visible gap exists between adjacent ends.

7. The laminate of claim 6 wherein the vapor-impermeable scrim is a metal.

8. The laminate of claim 6 wherein the foam bodies are heat welded.

9. The laminate of claim 6 including a reinforcement scrim generally parallel to and remote from the skin member.

* * * * *